United States Patent
Karatsinides et al.

(10) Patent No.: US 11,480,260 B2
(45) Date of Patent: Oct. 25, 2022

(54) METHOD OF OPERATING A VEHICLE

(71) Applicant: GE Aviation Systems LLC, Grand Rapids, MI (US)

(72) Inventors: Spiro P. Karatsinides, Grand Rapids, MI (US); Gregory A. Stark, Wayland, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 603 days.

(21) Appl. No.: 16/459,848

(22) Filed: Jul. 2, 2019

(65) Prior Publication Data

US 2021/0003229 A1 Jan. 7, 2021

(51) Int. Cl.
| | |
|---|---|
| *F16K 31/00* | (2006.01) |
| *F16K 31/06* | (2006.01) |
| *F02N 9/04* | (2006.01) |
| *F16K 1/12* | (2006.01) |
| *F16K 15/02* | (2006.01) |
| *F16K 15/18* | (2006.01) |
| *F16K 31/08* | (2006.01) |

(52) U.S. Cl.
CPC ............ *F16K 31/0655* (2013.01); *F02N 9/04* (2013.01); *F16K 1/12* (2013.01); *F16K 15/028* (2013.01); *F16K 15/18* (2013.01); *F16K 31/0658* (2013.01); *F16K 31/082* (2013.01)

(58) Field of Classification Search
CPC ............ F16K 31/0655; F16K 31/0658; F16K 31/082; F16K 15/18; F16K 15/028; F16K 1/12; F02N 9/04; G01S 5/0278; G01S 19/48; G05D 1/0088; G01C 21/165; G01C 23/005
See application file for complete search history.

(56) References Cited

U.S. PATENT DOCUMENTS

| | | | |
|---|---|---|---|
| 5,075,694 A | | 12/1991 | Donnanglo et al. |
| 5,432,520 A | * | 7/1995 | Schneider ............... F41G 7/346 |
| | | | 342/25 F |
| 5,570,304 A | * | 10/1996 | Mark .................... G01C 21/16 |
| | | | 703/7 |
| 6,408,245 B1 | | 6/2002 | An et al. |
| 8,052,054 B1 | | 11/2011 | Mingrone et al. |
| 8,065,074 B1 | | 11/2011 | Liccardo |
| 8,600,671 B2 | | 12/2013 | Wang |

(Continued)

OTHER PUBLICATIONS

Groves et al., "Optimising the Integration of Terrain Referenced Navigation with INS and GPS", ION GNSS 17th International Technical Meeting of the Satellite Division, Sep. 21-24, 2004, 12 pages, Long Beach, CA.

(Continued)

*Primary Examiner* — Phutthiwat Wongwian
*Assistant Examiner* — Sherman D Manley
(74) *Attorney, Agent, or Firm* — McGarry Bair PC

(57) ABSTRACT

A method of operating a vehicle includes navigating the vehicle along a path, collecting a set of navigation parameters of the vehicle from at least one of a sensor, a global positioning system, or an inertial reference system, determining a set of statistical uncertainties related to at least some navigation parameters in the set of navigation parameters, and associating a set of statistical weights to the at least some navigation parameters.

19 Claims, 6 Drawing Sheets

(56) References Cited

U.S. PATENT DOCUMENTS

| | | | |
|---|---|---|---|
| 9,714,841 B2 | 7/2017 | Toda et al. | |
| 10,466,362 B1* | 11/2019 | Wang | G01C 21/165 |
| 2004/0189492 A1 | 9/2004 | Selk, II et al. | |
| 2005/0125141 A1* | 6/2005 | Bye | G01C 21/165 |
| | | | 701/469 |
| 2005/0162306 A1* | 7/2005 | Babitch | G01S 5/021 |
| | | | 342/357.74 |
| 2006/0058928 A1* | 3/2006 | Beard | G05D 1/101 |
| | | | 244/175 |
| 2009/0322598 A1* | 12/2009 | Fly | G01S 19/41 |
| | | | 342/357.48 |
| 2013/0069822 A1 | 3/2013 | Wu et al. | |
| 2016/0216119 A1* | 7/2016 | Omr | G01C 21/165 |
| 2017/0153323 A1* | 6/2017 | Luna, Jr. | G01S 5/10 |
| 2017/0363428 A1 | 12/2017 | Faulkner et al. | |
| 2018/0340779 A1* | 11/2018 | Faulkner | F41G 7/36 |
| 2020/0130864 A1* | 4/2020 | Brockers | B60L 53/37 |
| 2021/0278847 A1* | 9/2021 | Prikhodko | G05D 1/027 |

OTHER PUBLICATIONS

Michael A. G. Peters, "Development of a TRN/INS/GPS Integrated Navigation System", published Oct. 14, 1991, 6 pages, Amsterdam.
European Patent Office, Extended European Search Report re Corresponding Application No. 20179841.0-1001, dated Dec. 4, 2020, 11 pages, Munich, Germany.
W. R. Williamson et al., "An Instrumentation System Applied to Formation Flight", IEEE Transactions on Control System Technology, v. 15, No. 1, pp. 75-85 (Jan. 2007).

\* cited by examiner

METHOD OF OPERATING A VEHICLE

TECHNICAL FIELD

The disclosure generally relates to methods of operating vehicles, such as aircraft, including the collection of navigational parameters of the vehicle during operation.

BACKGROUND

In contemporary vehicles including aircraft, numerous data sources can be considered for determining desired navigational parameters, such as position, speed, direction, altitudes, paths, or suitable waypoints, or for estimating time of arrival and fuel burned during operation, etc. Accuracy and reliability of such determinations are important for path adjustments or updates, as well as for traffic control relating to other vehicles that may be nearby.

BRIEF DESCRIPTION

In one aspect, the disclosure relates a method of operating a vehicle. The method includes navigating the vehicle along a path, collecting a set of navigation parameters of the vehicle from at least one of a sensor, a global positioning system, or an inertial reference system, determining a set of statistical uncertainties related to at least some navigation parameters in the set of navigation parameters, associating a set of statistical weights to the at least some navigation parameters based on the set of statistical uncertainties, determining a navigational solution for the vehicle based on the set of statistical weights, and operating the vehicle in accordance with the navigational solution.

In another aspect, the disclosure relates to a method of operating an aircraft. The method includes navigating the aircraft along a flight path, collecting a set of navigation parameters of the aircraft from at least one of a sensor, a global positioning system, or an inertial reference system, determining a set of preliminary solutions for the set of navigation parameters by applying a Kalman filter, determining a set of errors for the set of preliminary solutions, determining, via a covariance matrix, a set of statistical uncertainties for the set of preliminary solutions based on the set of errors, associating a set of statistical weights to the set of preliminary solutions based on the set of statistical uncertainties, forming a navigational solution for the aircraft by blending the set of preliminary solutions based on the set of statistical weights, and operating the aircraft in accordance with the navigational solution.

DETAILED DESCRIPTION

Figure 1:
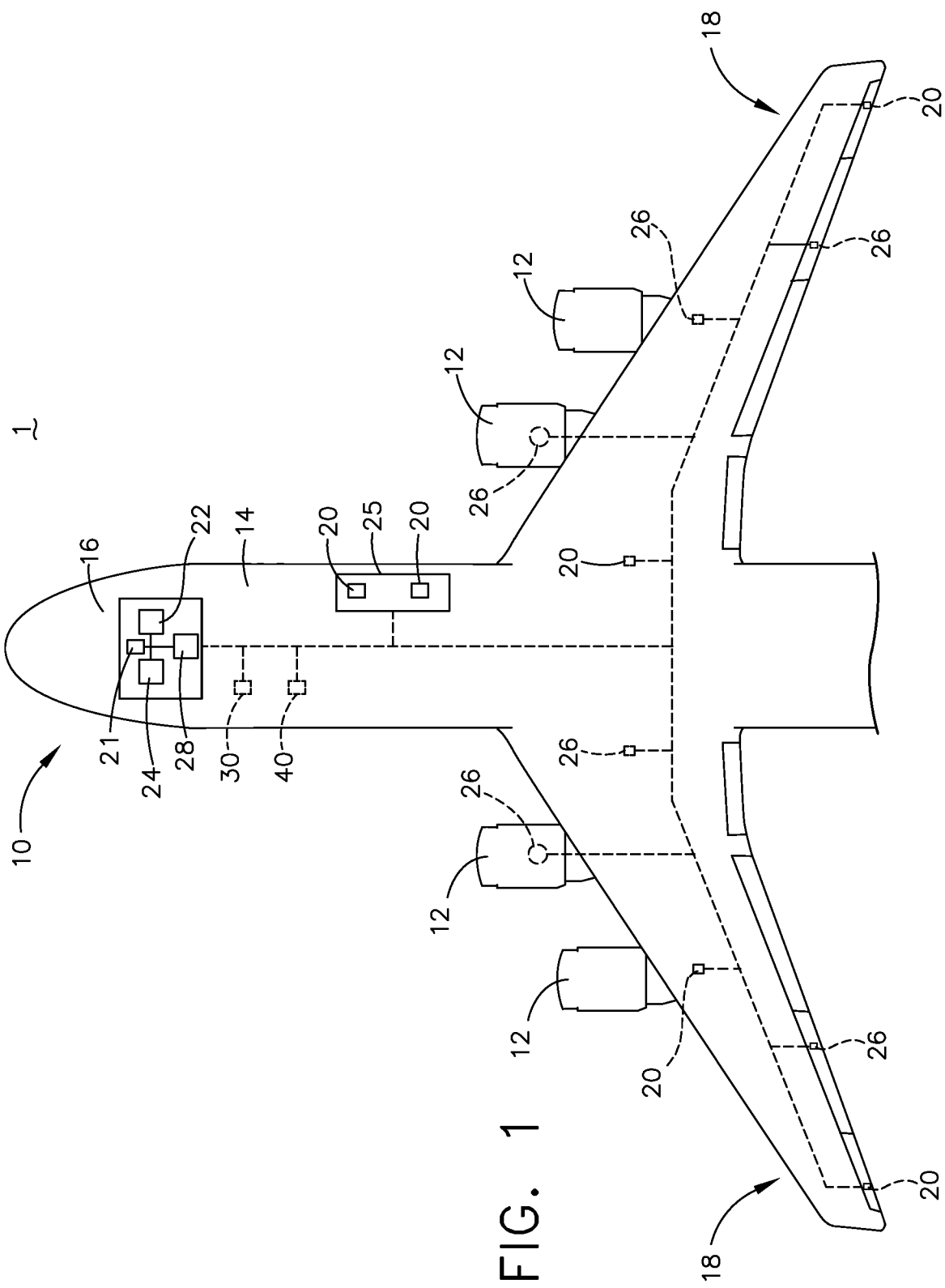
FIG. 1 is a top-down schematic view of a portion of a vehicle in the form of an aircraft in accordance with various aspects described herein.

Aspects of the present disclosure are generally directed to a method of operating a vehicle and including functions, mechanisms, or operations such as navigation. For purposes of illustration, the present disclosure will be described in the context of a flight management system in an aircraft environment. It will be understood, however, that the disclosure is not so limited and may have general applicability in non-aircraft applications, non-vehicular applications, or other mobile, land-based, aqueous-based, or similar applications.

Aspects of the disclosure will be described in the general context of a method that can be implemented in one aspect by a program product including machine-executable instructions such as program code, for example, in the form of program modules. Generally, program modules include routines, programs, objects, components, data structures, algorithms, etc. that have the technical effect of performing particular tasks or implement particular abstract data types. Machine-executable instructions, associated data structures, and program modules represent examples of program code for executing the method disclosed herein. Machine-executable instructions can include, for example, instructions and data, which cause a general purpose computer, special purpose computer, or special purpose processing machine to perform a certain function or group of functions.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

FIG. 1 depicts one exemplary vehicle 1 in the form of an aircraft 10. The aircraft 10 can include one or more propulsion engines 12 coupled to a fuselage 14, a cockpit 16 positioned in the fuselage 14, and wing assemblies 18 extending outward from the fuselage 14. A plurality of aircraft systems 20 that enable proper operation of the aircraft 10 (or subsystems thereof) can be included, such as, but not limited to, a flight control computer 22, and a communication system having a wireless communication link 24. The exemplary aircraft 10 has been illustrated in the form of a commercial aircraft. It is contemplated that aspects of the disclosure can be used in other environments including, but not limited to, fixed-wing aircraft, rotating-wing aircraft, personal aircraft, or other manned or unmanned vehicles.

The plurality of aircraft systems 20 can reside within the cockpit 16, within a dedicated electronics and equipment bay 25, or in other locations throughout the aircraft 10 including the engines 12. Such aircraft systems 20 can include but are not limited to: an electrical system, an oxygen system, hydraulics and/or pneumatics system, a fuel system, a propulsion system, navigation systems, flight controls, audio/video systems, an Integrated Vehicle Health Management (IVHM) system, Onboard Maintenance System, Central Maintenance Computer, and systems associated with the mechanical structure of the aircraft 10. A variety of aircraft systems 20 have been illustrated for exemplary purposes and it will be understood that they are non-limiting example of schematically representative systems that can be included in the aircraft 10.

The cockpit 16 can include at least one display 21 configured to display a variety of parameters including navigational data, flight time, fuel consumption, weather conditions, pilot advisories, current heading, or the like. The display 21 can include an electronic viewable screen, and can also be configured to receive user input via a touchscreen, keyboard, buttons, dials, or other input devices.

The flight control computer 22, which can include a flight management computer, can among other things, automate the tasks of piloting and tracking the flight plan of the aircraft 10. The flight control computer 22 can include or be associated with any suitable number of individual microprocessors, power supplies, storage devices, interface cards, auto flight systems, flight management computers, and other standard components. The flight control computer 22 can include or cooperate with any number of software programs (e.g., flight management programs) or instructions designed to carry out the various methods, process tasks, calculations, and control/display functions necessary for operation of the aircraft 10. The flight control computer 22 is illustrated as being in communication with the plurality of aircraft systems 20, the wireless communication link 24, and the display 21. It is contemplated that the flight control computer 22 can aid in operating the aircraft systems 20 and can send and receive information from the aircraft systems 20.

The wireless communication link 24 can be communicably coupled to the flight control computer 22 or other processors of the aircraft to transfer flight data off the aircraft 10. Such a wireless communication link 24 can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. Further, the wireless communication link 24 can be communicably coupled with the flight control computer 22 through a wired or wireless link. Although only one wireless communication link 24 has been illustrated, it is contemplated that the aircraft 10 can have multiple wireless communication links communicably coupled with the flight control computer or other onboard computing device receiving flight information. Such multiple wireless communication links can provide the aircraft 10 with the ability to transfer flight data off the aircraft 10 in a variety of ways such as by satellite, GSM, or WiFi.

Further, one or more sensors 26 can be provided on or within the aircraft 10 to obtain flight data during operation of the aircraft 10 including, but not limited to, latitude, longitude, altitude, velocity, acceleration, angular rate, heading, bearing, or the like. The one or more sensors 26 can be included in any aircraft system 20, including being communicatively coupled to any aircraft system 20. The one or more sensors 26 can also be capable of sensing and providing both environmental and aircraft data. As used herein, "environmental data" can include or refer to, in not limiting examples, as sensed or measured weather or air data including temperature, pressure, relative humidity, icing, turbulence data, other data related to the environmental considerations or factors external to the aircraft, or the like. Also, as used herein, "aircraft data" can include or refer to, in not limiting examples, as sensed or measured data from any aircraft system 20 including navigational data, braking hydraulics, speed and performance parameters including deceleration data, acceleration data, landing performance data, take-off performance data, derated thrust data, runway condition parameters, aircraft weight or class, attitude or location, fuel temperature, or the like. The sensors 26 can also be capable of integrating such information with a physical location of where the data was obtained as well as a time stamp of when such information was obtained. For example, the environmental or aircraft data, e.g. acceleration or angular rate data, can include an association with a coordinate or set of coordinates, or the like, indicating where the sensing or measuring occurred.

The sensors 26 can be located in any suitable location on or within the aircraft 10, such as the nose, tail, engine 12, wing assembly 18, elsewhere on the fuselage 14 or within the cabin or cockpit, or the like, or any combination thereof. Any number of sensors 26 can be utilized. The sensors 26 can be operably coupled for communication with the flight control computer 22, the flight management system 28, or another controller onboard the aircraft 10 to provide the aircraft 10 with such flight data. It is also contemplated that the sensors 26 can be communicatively coupled with the wireless communication link 24 to allow the information obtained by the sensors 26 to be relayed off the aircraft 10, such as to a ground station or another aircraft (not shown), without the flight control computer 22 or flight management system 28. Additionally or alternatively, aircraft data can be obtained directly from the aircraft systems 20 and relayed off the aircraft 10.

In another example, the flight data computer 22 can receive data from another aircraft. The program can include a computer program product that can include machine-readable media for carrying or having machine-executable instructions or data structures stored thereon. Such machine-readable media can be any available media, which can be accessed by a general purpose or special purpose computer or other machine with a processor.

The aircraft 10 can further include a flight management system 28 in communication with the flight control computer 22. It will be understood that the flight management system 28 can be hard wired to the flight control computer 22 or may communicate in any suitable manner with the flight control computer 22 including via wireless communication.

A global positioning system (GPS) 30 and an inertial reference system (IRS) 40 can also be provided in the aircraft 10. The global positioning system 30 can include an antenna (not shown) configured to communicate with a set of satellites or at least one communication network. The inertial reference system 40 can include sensing components including gyroscopes, accelerometers, or magnetometers, in order to determine a position, velocity, acceleration, angular rate, orientation, or the like, of the aircraft 10. Either or both of the GPS 30 and IRS 40 can generate, output, or otherwise communicate data, including data relating to the position, velocity, acceleration, angular rate, orientation, or the like, of the aircraft 10. In non-limiting examples, such data can be output or communicated to the display 21, flight control computer 22, the flight management system 28, or the like. In addition, multiple GPSs 30 or IRSs 40 can be provided for measurement redundancy or improved accuracy or availability.

While not shown for brevity, it is further contemplated that a system 20 of the aircraft 10 can include a distance measuring equipment (DME) navigation radio or a very high frequency (VHF) omni-directional ranging (VOR) navigation radio. Such a DME or VOR can include sensors 26 in the form of antennas configured to receive distance and directional bearing data from associated DME or VOR ground stations, such as navigational aids. The distance and bearing information received from such ground stations can be processed or otherwise utilized to determine a position of the aircraft 10. In non-limiting examples, such data can be output or communicated to any or all of the display 21, flight control computer 22, flight management system 28, or the like, including for navigation or other operation of the aircraft 10. In addition, multiple DMEs or VORs can be provided for measurement redundancy or improved accuracy.

During operation, a system 20 of the aircraft 10, the flight control computer 22, or the flight management system 28 can receive information or flight data from other aircraft systems 20, the one or more sensors 26, the GPS 30, or the IRS 40. The flight data can include information about the location, motion, orientation, or the like, of the aircraft 10. Such flight data can be received by a controller module having a processor and memory, displayed to a user such as on the display 21, transmitted to another aircraft or a ground station (not shown) via the wireless communication link 24, utilized by the flight control computer 22 for calculations or updates relating to other aircraft operations such as fuel calculations, engine efficiencies, flight path or timing updates, or cost estimates, in non-limiting examples, or the like.

Figure 2:
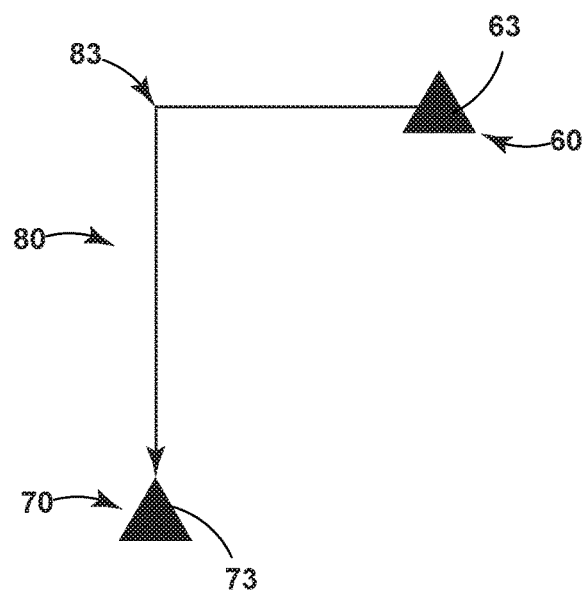
FIG. 2 is a schematic view of navigational parameters of the aircraft of FIG. 1 in accordance with various aspects described herein in the form of a position of the aircraft.
Figure 2:
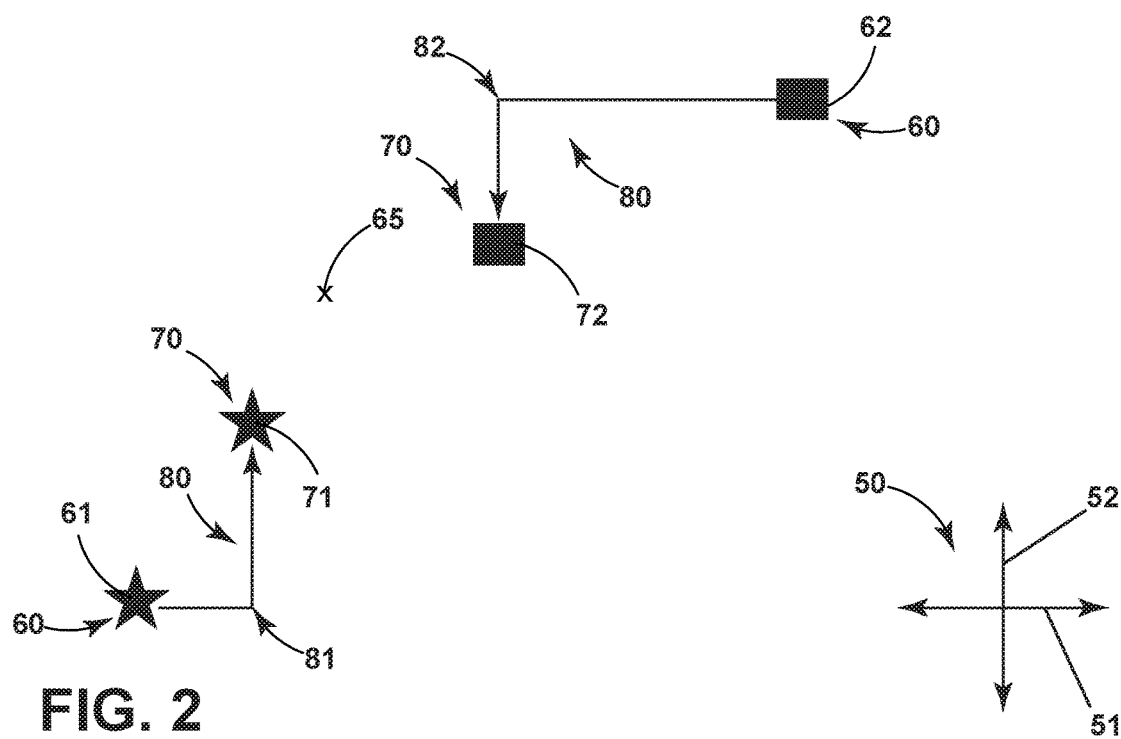

One example of such flight data will be described in further detail with reference to FIGS. 2 and 3. Referring now to FIG. 2, a coordinate system 50 is illustrated with plotted navigational parameters from at least one source on the aircraft 10. The at least one source can include the one or more sensors 26, the GPS 30, the IRS 40, or any other aircraft system 20 (FIG. 1). In the example shown, the coordinate system 50 is in the form of a latitude-longitude reference system with a first axis 51 representing longitude and a second axis 52 representing latitude. Any suitable coordinate system for any suitable vehicle can be utilized, such as an Earth-centered, Earth-fixed (ECEF) X/Y/Z reference system made relative to the aircraft 10, or a latitude/longitude/altitude reference system, in non-limiting examples.

A set of navigation parameters 60 is plotted on the coordinate system 50. The set of navigation parameters 60 can include any data or state variables relating to navigation of the aircraft 10 including, but not limited to, a current or past position, velocity, acceleration, orientation, heading, bearing, or any combination thereof. In the illustrated example, the set of navigation parameters 60 includes a first position 61 shown with a star, a second position 62 shown with a rectangle, and a third position 63 shown with a triangle. The positions 61, 62, 63 can be obtained from any or all of the sensors 26, GPS 30, IRS 40, or the like. For example, it is contemplated that the positions 61, 62, 63 can each be obtained from a single sensor 26 or source, such as the IRS 40. In another example, the positions 61, 62, 63 can be obtained from three separate inertial reference systems (or redundancies thereof) on the aircraft 10, each providing an independent output. In still another example, the IRS 40 can provide the first position 61, the GPS 30 can provide the second position 62, and a sensor 26 can provide the third position 63.

The set of navigation parameters 60 can include errors or uncertainties from a variety of sources, including measurement errors or calibration errors. In the illustrated example, the positions 61, 62, 63 represent the position of the aircraft 10 plotted on the coordinate system 50. An 'x' symbol denotes a "true" position 65 of the aircraft 10, i.e. the position that would be measured in the event of zero measurement error or uncertainty. Table 1 below illustrates one non-limiting example of the positions 61, 62, 63 and the true position 65. While Table 1 is shown having latitude/longitude with significant digits, any representation of position 61, 62, 63 data or representation can be included in aspects of the disclosure.

TABLE 1

| First position (61) | N41.28626984 | W122.59631330 |
| Second position (62) | N41.21987530 | W122.62962310 |
| Third position (63) | N41.35301667 | W122.55768753 |
| True position (65) | N41.25296125 | W122.61296820 |

A set of preliminary solutions 70 can be determined, including being computed, based on at least some navigation parameters in the set of navigation parameters 60. As used herein, "preliminary solution" will refer to a value that represents an updated navigation parameter by accounting for errors or uncertainties that may be associated with that navigation parameter. Stated another way, "preliminary solution" can represent an updated, modified, altered, or otherwise "corrected" navigational parameter. In non-limiting examples, the set of preliminary solutions 70 can be determined or computed by hand, by the flight management system 28, by the flight control computer 22, or by any other suitable aircraft system 20, or the like, or any combination thereof.

The set of preliminary solutions 70 can account for errors or uncertainties present in the set of navigation parameters 60. In one non-limiting example, a Kalman filter can be applied to at least some of the set of navigation parameters 60 to obtain the set of preliminary solutions 70. Still referring to FIG. 2, the corresponding set of preliminary solutions 70 includes a first preliminary solution 71 shown with a star, a second preliminary solution 72 shown with a rectangle, and a third preliminary solution 73 shown with a triangle.

In the example shown, a Kalman filter is applied to the first, second, and third positions 61, 62, 63 to obtain the corresponding preliminary solutions 71, 72, 73. For example, the Kalman filter can operate on sensor 26 measurements from anywhere on the aircraft 10 or a system 20 thereof, including the GPS 30, IRS 40, a DME or VOR as described above, or the like, to provide correction to the set of navigation parameters 60.

The preliminary solutions 71, 72, 73 can still include errors or uncertainties, as indicated by their relative deviation or distance from the representative true position 65. A set of errors 80 can be determined or computed, such as via the Kalman filter, for each in the set of preliminary solutions 70. In non-limiting examples, the set of errors 80 can be determined or computed by hand, by the flight management system 28, by the flight control computer 22, or by any other suitable aircraft system 20, or the like, or any combination thereof.

The set of errors 80 is visually represented in FIG. 2 by arrows drawn from each position 61, 62, 63 to each corresponding preliminary solution 71, 72, 73. Larger errors are represented by larger arrows, and smaller errors are represented by smaller arrows. The set of errors 80 can represent a change or correction in position as a result of computing the preliminary solution (e.g. an adjustment to correct for measurement errors). In the example shown, the set of errors 80 includes a first error 81, a second error 82, and a third error 83 corresponding to a Kalman-filter output of position error estimates for each of the preliminary solutions 71, 72, 73. Table 2 below represents one non-limiting numerical example of the set of errors 80 corresponding to each position obtained from the IRS 40 in Table 1. Each error in the set of errors is represented by values in nautical miles (NM) with positive values referenced to "north" and "east." It will be understood that negative values correspond to "south" and "west," respectively. While "nautical miles" is shown in Table 2, any suitable unit including meters, kilometers, feet, or statute miles is included in aspects of the disclosure. For example, nautical miles can be converted to various standard units wherein 1 NM is approximately equal to 1852 meters or 6076 feet. It will also be understood that a latitudinal or longitudinal position change in degrees can correspond to different error amounts in nautical miles depending on the geographic location of the aircraft 10.

TABLE 2

| First error $\overline{X}_1$ (81) | −1.75 NM (N) | −0.8 NM (E) |
|---|---|---|
| Second error $\overline{X}_2$ (82) | −2.25 NM (N) | −1.25 NM (E) |
| Third error $\overline{X}_3$ (83) | 5.0 NM (N) | 2.5 NM (E) |

It can be appreciated that the third error 83 is numerically larger than the first and second errors 81, 82. This larger error is visually represented in FIG. 2 as a larger arrow drawn from the first position 61 toward the third preliminary solution 73 as compared to those drawn toward the first and second preliminary solutions 71, 72.

A set of statistical uncertainties can be related to at least some of the set of navigation parameters in 60, and can further be determined. The set of statistical uncertainties can be related to at least some navigation parameters in the set of navigation parameters 60. More specifically, the set of statistical uncertainties can represent an uncertainty in the Kalman-filter-obtained errors 81, 82, 83 described in Table 2. Differences in error amounts can occur due to a variety of circumstances, such as miscalibration, measurement error, modeling error, or sensor malfunction when obtaining the third position 63. In non-limiting examples, the set of statistical uncertainties can be determined or computed by hand, by the flight management system 28, by the flight control computer 22, or by any other suitable aircraft system 20, or the like, or any combination thereof.

Table 3 below represents one non-limiting example of such a set of statistical uncertainties computed for each of the errors in Table 2. The set of statistical uncertainties is given below in the form of covariance matrices referenced to the IRS 40 reference frame, in units of feet-squared.

TABLE 3

| First uncertainty $\overline{P}_1^{pos}$ | $\begin{bmatrix} 640000 & 17500 \\ 17500 & 490000 \end{bmatrix} ft^2$ |
|---|---|
| Second uncertainty $\overline{P}_2^{pos}$ | $\begin{bmatrix} 722500 & 15600 \\ 15600 & 360000 \end{bmatrix} ft^2$ |
| Third uncertainty $\overline{P}_3^{pos}$ | $\begin{bmatrix} 169000000 & 240000 \\ 240000 & 81000000 \end{bmatrix} ft^2$ |

It can be appreciated that the third uncertainty in Table 3 is larger than the both the first and second uncertainties. Referring now to FIG. 3, the set of statistical uncertainties given in Table 3 is schematically illustrated by the relative size of the markers used to indicate the preliminary solutions 71, 72, 73 on the coordinate system 50. The triangle denoting the third preliminary solution 73 is much larger than the star or rectangle denoting the respective first and second preliminary solutions 71, 72. In addition, the rectangle denoting the second preliminary solution 72 is larger relative to the star denoting the first preliminary solution 71. Stated another way, the relative difference in visual size of the preliminary solutions 71, 72, 73 indicates the amount of statistical uncertainty (e.g. a quantitative "value" measuring or representing absolute or relative certainty) in their corresponding position errors, such as those represented numerically in Table 2 above. In the illustrated example, larger visual sizes of the preliminary solutions 71, 72, 73 correspond to larger statistical uncertainties (e.g. reduced certainty or less certainty, compared with a smaller visual size), and smaller visual sizes correspond to smaller statistical uncertainties (e.g. increased certainty as compared with a larger visual size). In this manner, the set of statistical uncertainties can be related to at least some navigation parameters in the set of navigation parameters 60, such as the corresponding positions 61, 62, 63.

A statistical weight can be associated to each of the positions 61, 62, 63 based at least on the statistical uncertainties of their corresponding preliminary solutions 71, 72, 73. For example, the third preliminary solution 73 can be associated with a smaller statistical weight due to its larger uncertainty relative to those of the first and second preliminary solutions 71, 72. The first preliminary solution 71 can be given the greatest statistical weight due to its statistical uncertainty being smaller than those of the second and third preliminary solutions 72, 73. A statistical weight for one navigation parameter in the set 60 can be based on multiple statistical uncertainties, such as a blend of all statistical uncertainties. Equation 1 below gives one exemplary method of determining or computing a statistical weight, represented by an unbiased statistical weight $\overline{K}_1^{pos}$ associated with the first position 61:

$$\overline{K}_1^{pos} = \overline{P}_2^{pos}\overline{P}_3^{pos}(\overline{P}_1^{pos}\overline{P}_2^{pos} + \overline{P}_2^{pos}\overline{P}_3^{pos} + \overline{P}_1^{pos}\overline{P}_3^{pos})^{-1} \quad (1)$$

Table 4 below provides some exemplary values for a set of dimensionless statistical weights associated with each of the first, second, and third positions 61, 62, 63 based on the statistical uncertainties of Table 3. In non-limiting examples, the set of statistical weights can be determined or computed by hand, by the flight management system 28, by the flight control computer 22, or by any other suitable aircraft system 20, or the like, or any combination thereof. The set of statistical weights is shown in Table 4 as a covariance matrix corresponding to each of the first, second, and third positions 61, 62, 63 (FIG. 2). It can be appreciated that the third position 63 is associated with the smallest statistical weight, as it is related to the largest statistical uncertainty (Table 3).

TABLE 4

| | |
|---|---|
| First weight $\overline{K}_1^{pos}$ | $\begin{bmatrix} 0.529270 & -0.002371 \\ 0.001149 & 0.422401 \end{bmatrix}$ |
| Second weight $\overline{K}_2^{pos}$ | $\begin{bmatrix} 0.468729 & 0.002223 \\ -0.001173 & 0.575041 \end{bmatrix}$ |
| Third weight $\overline{K}_3^{pos}$ | $\begin{bmatrix} 0.002001 & 0.000148 \\ 0.000023 & 0.002558 \end{bmatrix}$ |

A navigational solution 90 for the aircraft 10 (FIG. 1) can be formed based on the set of navigation parameters 60, set of preliminary solutions 70, associated set of statistical weights (e.g. table 4), a combination thereof, or the like. For example, the navigational solution 90 can be in the form of a "blended" or "composite" position representing a combination of the first, second, and third positions 61, 62, 63 (FIG. 2). In one example, the statistical weights described above can be associated to the positions when determining or computing the navigational solution 90. More specifically, the navigational solution 90 can be an optimized navigational solution based on the set of statistical weights. In non-limiting examples, the navigational solution 90 can be determined or computed by hand, by the flight management system 28, by the flight control computer 22, or by any other suitable aircraft system 20, or the like, or any combination thereof.

Figure 3:
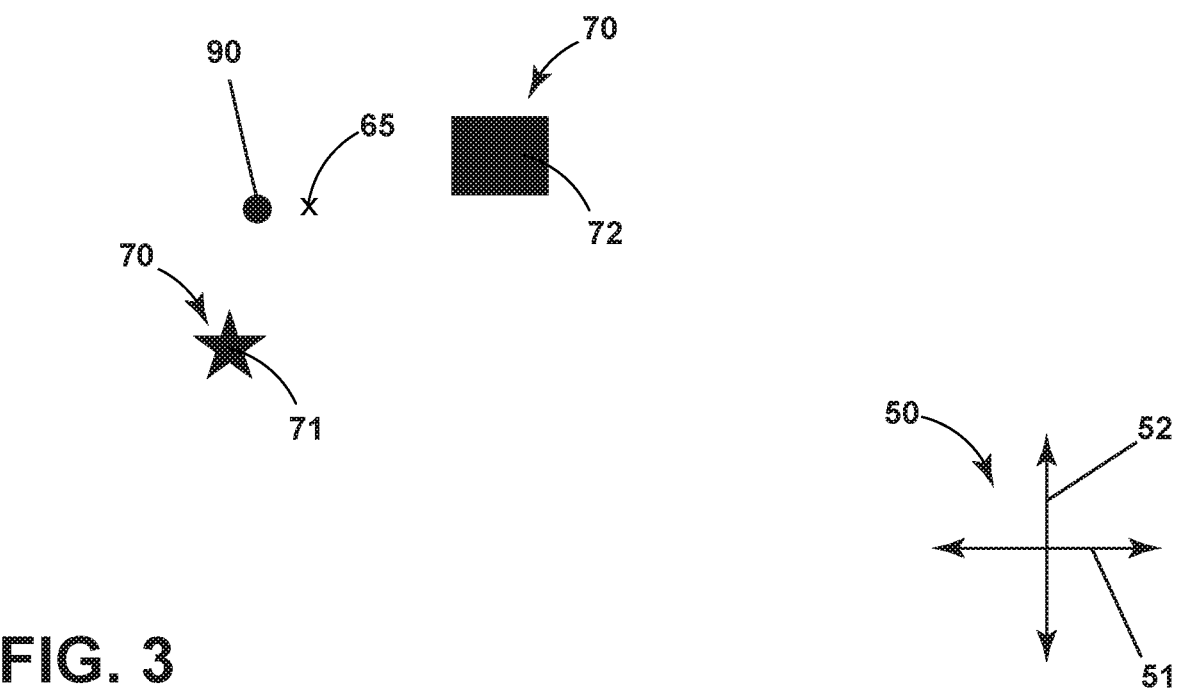
FIG. 3 is a schematic view of a navigational solution based on the navigational parameters for the aircraft of FIG. 1 in the form of a blended position of the aircraft in accordance with various aspects described herein.

In the example of FIG. 3, the set of statistical weights is visually represented by the navigational solution 90 being plotted closer to the first and second preliminary solutions 71, 72 as compared to the third. More specifically, the navigational solution 90 is plotted approximately equidistant from the first and second preliminary solutions 71, 72 to visually represent the associated first and second weights being approximately the same size. It will be understood that values being "approximately the same" as used herein will refer to such values not differing by more than a predetermined amount, such as by more than 10% in one example. In this manner, the preliminary solution having the smallest associated statistical uncertainty can be assigned the greatest statistical weight when determining or computing the navigational solution 90.

The set of statistical uncertainties can be utilized to form an overall uncertainty for the navigational solution 90. For example, in a similar fashion to determining the navigational solution 90, the errors of Table 3 can be combined or blended to construct the overall uncertainty of the navigational solution 90. The navigational solution 90 is plotted as a solid circle on the coordinate system 50 in FIG. 3. The overall uncertainty corresponding to the navigational solution 90 is shown by way of the relative visual size of the navigational solution 90 compared with that of the preliminary solutions 71, 72, 73. It is contemplated that the navigational solution 90 can have a smaller overall uncertainty than any of the statistical uncertainties corresponding to the preliminary solutions 71, 72, 73. In addition, the navigational solution can be more accurate than any of the preliminary solutions 71, 72, 73, as illustrated by its relative proximity to the true position 65.

Figure 4:
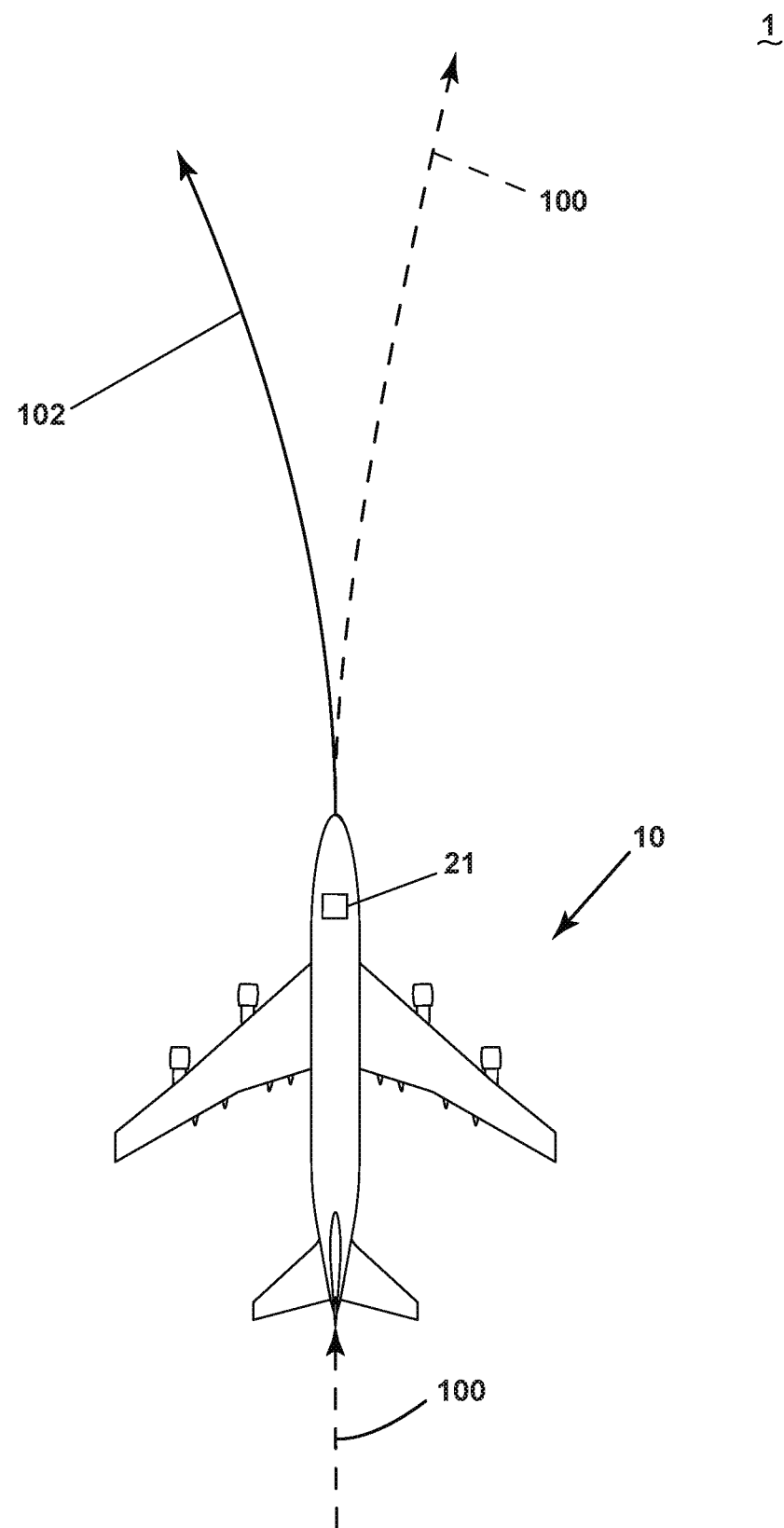
FIG. 4 is a schematic top view of the aircraft of FIG. 1 illustrating a current flight path and a modified flight path in accordance with various aspects described herein.

Referring now to FIG. 4, the aircraft 10 is illustrated flying along a current flight path 100. The display 21 is schematically illustrated in the aircraft 10. During operation, the set of navigation parameters 60 of the aircraft 10 can be collected from at least one of the sensor 26, GPS 30, IRS 40, the like, or a combination thereof (not shown in FIG. 4 for brevity). As explained above, the set of statistical uncertainties related to at least some navigation parameters in the set of navigation parameters 60, such as the positions 61, 62, 63 can be determined. The set of statistical weights can then be associated to the positions 61, 62, 63 based on the set of statistical uncertainties. The navigational solution 90 can finally be formed for the aircraft based on at least the set of statistical weights.

The navigational solution 90 can be displayed on the display 21 or communicated to the flight management system 28. For example, an estimate of position uncertainty (EPU), an actual navigation performance (ANP), a required navigation performance (RNP), or any combination thereof can be displayed on the display 21, or communicated to any or all of the flight control computer 22, the flight management system 28, or a suitable aircraft system 20. In one non-limiting example, the aircraft 10 or a subsystem thereof can include calculating, determining, comparing, or the like, the navigational solution 90 with other subsystem data or calculations, and new data or calculations can be generated or determined based thereupon. In yet another non-limiting example, the operation, control, flight, or operational parameters of the aircraft 10 or a subsystem thereof can be modified, overwritten, or superseded based upon, or in accordance with, the navigational solution 90.

It is contemplated that the navigational solution 90 can form an EPU or an ANP for the aircraft 10. For example, the RNP can represent a the required navigation performance along a planned flight path 102 against which the aircraft 10 is instructed to compare its actual position and make any adjustments necessary. For example, the navigational solution 90 forming the EPU can be compared to the RNP. If the EPU exceeds the RNP, an alert can be displayed on the display 21. In non-limiting examples, such an alert can signal that the EPU has exceeded the RNP, provide a recommended course correction to bring the aircraft 10 back to the planned flight path 102, prompt a pilot to perform a manual course correction, or prompt a pilot to engage an automatic system to alter the course of the aircraft 10. In addition, the navigational solution 90 can be automatically transmitted to a vehicle management system such as the flight management system 28 (FIG. 1) of the aircraft 10. In the illustrated example, the aircraft 10 is altered from its current flight path 100 toward the planned flight path 102 based on the navigational solution 90.

Figure 5:
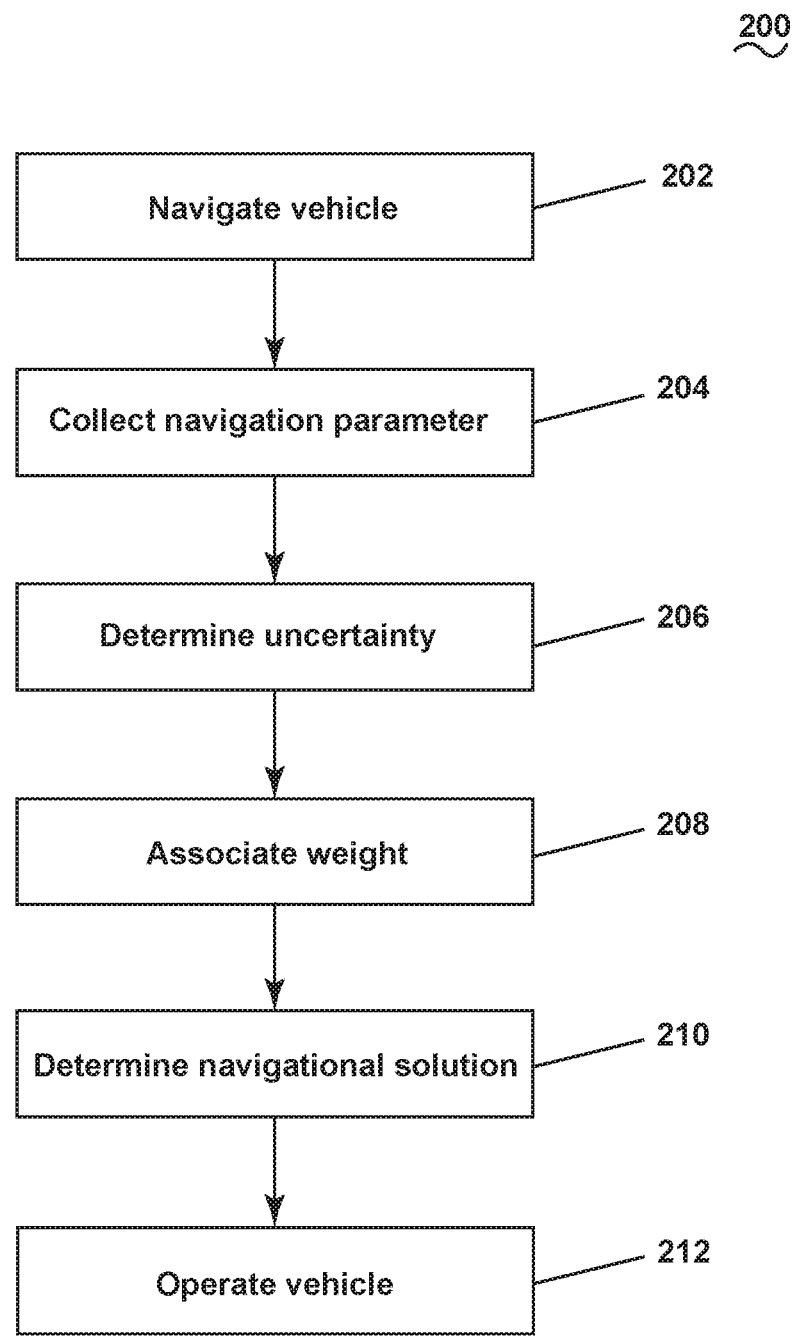
FIG. 5 is a flowchart illustrating a method of operating the aircraft of FIG. 1 in accordance with various aspects described herein.

Referring now to FIG. 5, a method 200 of operating the vehicle 1 is illustrated by way of the aircraft 10. At 202 the vehicle 1 can be navigated along a path, such as the current flight path 100 of FIG. 4. At 204 a set of navigation parameters of the vehicle 1, such as the set of navigation parameters 60, can be collected from at least one of a sensor 26, a global positioning system 30, an inertial reference system 40, or the like. At 206 a set of statistical uncertainties related to at least some navigation parameters in the set of navigation parameters can be determined (FIG. 3). At 208 a set of statistical weights (FIG. 3) can be associated to the at least some navigation parameters based on the set of statistical uncertainties. A navigational solution, such as the navigational solution 90, can be determined at 210 for the vehicle 1 based on the set of statistical weights. At 212, the vehicle 1 can be operated in accordance with the navigational solution 90. One example of such operating can include displaying the navigational solution on a display, such as the display 21 (FIG. 4). Another example of operating the vehicle 1 can include altering a current path based on the navigational solution 90.

It will be understood that any aspect of the method 200, including the flying at 202, the collecting at 204, the determining at 206, or the associating at 208, can be performed by hand, by the flight control computer 22, by the flight management system 28, by any other suitable aircraft system 20 or subsystem thereof, or the like, or combinations thereof.

Figure 6:
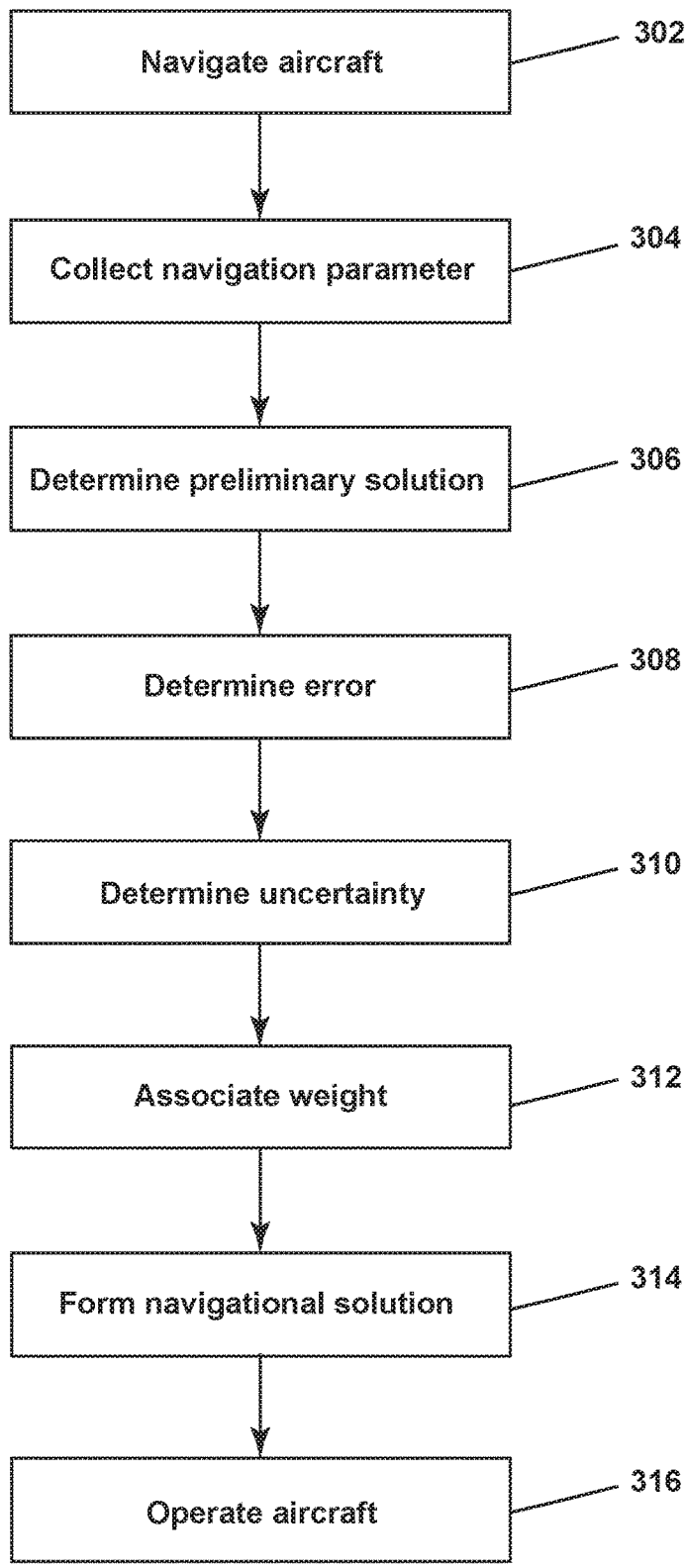
FIG. 6 is a flowchart illustrating another method of operating the aircraft of FIG. 1 in accordance with various aspects described herein.

FIG. 6 illustrates a method 300 of operating the aircraft 10. At 302 the aircraft 10 can be navigated or flown along a flight path, such as the current flight path 100 of FIG. 4. At 304 a set of navigation parameters of the aircraft, such as the set 60, can be collected from at least one of a sensor 26, a global positioning system 30, or an inertial reference system 40. At 306, a set of preliminary solutions, such as the set of preliminary solutions 70, can be determined, including computed, via a Kalman filter for the set of navigation parameters. At 308 a set of errors, such as the set of errors 80, can be determined, including computed, for the set of preliminary solutions as described in FIG. 3. At 310 a set of statistical uncertainties can be determined, via a covariance matrix, for the set of preliminary solutions based on the set of errors as described in FIG. 3. At 312 a set of statistical weights can be associated to the set of preliminary solutions based on the set of statistical uncertainties. A navigational solution, such as the navigational solution 90, can be formed at 314 by blending the set of preliminary solutions based on the set of statistical weights as described in FIG. 3. At 316 the aircraft 10 can be operated in accordance with the navigational solution 90 including, but not limited to, displaying the navigational solution 90 the display 21 or altering the current flight path 100 for the aircraft 10 (FIG. 4).

It will be understood in either of the methods 200, 300 that, in one example, the set of preliminary solutions can be determined prior to determining or computing the set of errors. The set of errors can be determined prior to determining the set of statistical uncertainties. The set of statistical weights can be associated to the set of preliminary solutions prior to forming the navigational solution. Determining or forming the navigational solution can further include determining an overall uncertainty as described in FIG. 3. In addition, the method 200, 300 can also include altering a current flight path of the aircraft 10, such as the flight path 100.

It will also be understood that the set of preliminary solutions can be determined for any or all of the navigation parameters in the set of navigation parameters of the aircraft. For example, the flight management system on the aircraft can be configured to perform a data integrity check on the set of navigation parameters or discard any entries determined to be spurious, such as from a malfunctioning sensor. Such a check can be performed prior to the determining of the set of preliminary solutions.

The above described aspects provide for several benefits, including improved navigation performance such as position and ground speed accuracy. Forming a single blended navigational solution, (e.g. a single blended position) from multiple independently-obtained navigational parameters (e.g. position) provides for improved accuracy and reduced uncertainty compared to any of the individually-obtained navigational parameters, even when such individually-obtained parameters have been Kalman-filter corrected.

In addition, a technical effect of the above described aspects is the provision of a scalable method of aircraft operation or navigation across multiple cockpit architectures. Some examples include a split cockpit architecture having three IRS installations, a single-solution cockpit architecture having two IRS installations, or an unmanned aerial vehicle having a single IRS installation. Where multiple IRS navigational solutions or parameters may be provided on an aircraft, each parameter has its own associated uncertainty. The single blended solution accounts for the associated uncertainties and errors in the individually-obtained navigational parameters and minimizes the overall uncertainty associated with the single blended solution.

To the extent not already described, the different features and structures of the various aspects can be used in combination, or in substitution with each other as desired. That one feature is not illustrated in all of the aspects is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

1. A method of operating a vehicle, the method comprising:
   navigating the vehicle along a path;
   collecting a set of navigation parameters of the vehicle from at least one of a sensor, a global positioning system, or an inertial reference system;
   determining a set of statistical uncertainties related to at least some navigation parameters in the set of navigation parameters;
   associating a set of statistical weights to the at least some navigation parameters based on the set of statistical uncertainties;
   determining a navigational solution for the vehicle based on the set of statistical weights; and operating the vehicle in accordance with the navigational solution.

2. The method of any of the disclosed aspects, further comprising determining a set of preliminary solutions based on the set of navigation parameters via a Kalman filter.

3. The method of any of the disclosed aspects, further comprising determining a set of errors for the set of preliminary solutions, wherein each in the set of errors corresponds to a preliminary solution in the set of preliminary solutions.

4. The method of any of the disclosed aspects wherein each in the set of statistical uncertainties corresponds to an error in the set of errors.

5. The method of any of the disclosed aspects wherein the set of preliminary solutions is determined prior to determining the set of errors, wherein the set of errors is determined prior to determining the set of statistical uncertainties, wherein the set of statistical weights is associated prior to determining the navigational solution, and wherein the determining the navigational solution further comprises determining an overall uncertainty for the navigational solution.

6. The method of any of the disclosed aspects wherein the determining the navigational solution comprises blending the set of preliminary solutions via the Kalman filter.

7. The method of any of the disclosed aspects wherein the set of preliminary solutions comprises at least one of a current position or a current velocity of the vehicle.

8. The method of any of the disclosed aspects wherein the navigational solution comprises an optimized navigational solution based on the set of statistical weights.

9. The method of any of the disclosed aspects wherein the set of navigation parameters comprises at least one of a position, a velocity, a heading, or a reference frame.

10. The method of any of the disclosed aspects wherein the operating further comprises displaying at least one of an estimate of position uncertainty, an actual navigation performance, or a required navigation performance.

11. The method of any of the disclosed aspects, further comprising comparing an estimate of position uncertainty to a required navigation performance, and wherein the displaying comprises a displayed alert when the estimate of position uncertainty is greater than the required navigation performance.

12. The method of any of the disclosed aspects, further comprising automatically transmitting the navigational solution to a vehicle management system.

13. The method of any of the disclosed aspects, further comprising altering a current path based on the navigational solution.

14. A method of operating an aircraft, the method comprising:
navigating the aircraft along a flight path;
collecting a set of navigation parameters of the aircraft from at least one of a sensor, a global positioning system, or an inertial reference system;
determining a set of preliminary solutions for the set of navigation parameters by applying a Kalman filter;
determining a set of errors for the set of preliminary solutions;
determining, via a covariance matrix, a set of statistical uncertainties for the set of preliminary solutions based on the set of errors;
associating a set of statistical weights to the set of preliminary solutions based on the set of statistical uncertainties;
forming a navigational solution for the aircraft by blending the set of preliminary solutions based on the set of statistical weights; and
operating the aircraft in accordance with the navigational solution.

15. The method of any of the disclosed aspects wherein the set of preliminary solutions comprises at least one of a position of the aircraft or a velocity of the aircraft.

16. The method of any of the disclosed aspects wherein the forming the navigational solution further comprises determining an overall uncertainty for the navigational solution based on the set of statistical weights.

17. The method of any of the disclosed aspects wherein the overall uncertainty comprises an estimate of position uncertainty for the aircraft.

18. The method of any of the disclosed aspects wherein the displaying further comprises displaying at least one of an estimate of position uncertainty, an actual navigation performance, or a required navigation performance.

19. The method of any of the disclosed aspects, further comprising comparing an estimate of position uncertainty to a required navigation performance, and wherein the displaying comprises a displayed alert when the estimate of position uncertainty is greater than the required navigation performance.

20. The method of any of the disclosed aspects, further comprising altering a current flight path based on the navigational solution.

What is claimed is:

1. A method of operating a vehicle, the method comprising:
collecting a set of navigation parameters of the vehicle from at least one of a sensor, a global positioning system, or an inertial reference system;
applying a correction to each navigation parameter in the set of navigation parameters to determine a corresponding set of preliminary navigational solutions;
determining a statistical uncertainty corresponding to each preliminary navigational solution in the set of preliminary navigational solutions to define a set of statistical uncertainties;
associating a statistical weight to each navigation parameter in the set of navigation parameters, based on the set of statistical uncertainties, to define a set of statistical weights;
blending the set of preliminary navigational solutions, based on the set of statistical weights, to determine a single navigational solution for the vehicle; and
operating the vehicle in accordance with the single navigational solution.

2. The method of claim 1, wherein the applying the correction is performed via a Kalman filter.

3. The method of claim 2, further comprising determining a set of errors for the set of preliminary navigational solutions, wherein each error in the set of errors corresponds to a preliminary navigational solution in the set of preliminary navigational solutions.

4. The method of claim 3 wherein each statistical uncertainty in the set of statistical uncertainties corresponds to an error in the set of errors.

5. The method of claim 4 wherein the set of preliminary navigational solutions is determined prior to determining the set of errors, wherein the set of errors is determined prior to determining the set of statistical uncertainties, wherein the set of statistical weights is associated prior to determining the single navigational solution, and further comprising determining an overall uncertainty for the single navigational solution.

6. The method of claim 2 wherein the set of preliminary navigational solutions comprises at least one of a current position or a current velocity of the vehicle.

7. The method of claim 1 wherein the single navigational solution comprises an optimized single navigational solution based on the set of statistical weights.

8. The method of claim 1 wherein the set of navigation parameters comprises at least one of a position, a velocity, a heading, or a reference frame.

9. The method of claim 1 wherein the operating further comprises displaying at least one of an estimate of position uncertainty, an actual navigation performance, or a required navigation performance.

10. The method of claim 9, further comprising comparing an estimate of position uncertainty to a required navigation performance, and wherein the displaying comprises a displayed alert when the estimate of position uncertainty is greater than the required navigation performance.

11. The method of claim 1, further comprising automatically transmitting the single navigational solution to a vehicle management system.

12. The method of claim 1, further comprising altering a current path based on the single navigational solution.

13. A method of operating an aircraft, the method comprising:
  collecting a set of navigation parameters of the aircraft from at least one of a sensor, a global positioning system, or an inertial reference system;
  applying a correction, by way of a Kalman filter, to each navigation parameter in the set of navigation parameters to determine a corresponding set of preliminary navigational solutions;
  determining a set of errors for the set of preliminary navigational solutions;
  determining, by a covariance matrix, a statistical uncertainty for each error in the set of errors to define a set of statistical uncertainties;
  associating a statistical weight to each navigation parameter in the set of navigation parameters, based on the set of statistical uncertainties, to define a set of statistical weights;
  blending the set of preliminary navigational solutions, based on the set of statistical weights, to determine a single navigational solution for the aircraft; and
  operating the aircraft in accordance with the single navigational solution.

14. The method of claim 13 wherein the set of preliminary navigational solutions comprises at least one of a position of the aircraft or a velocity of the aircraft.

15. The method of claim 13, further comprising determining an overall uncertainty for the single navigational solution based on the set of statistical weights.

16. The method of claim 15 wherein the overall uncertainty comprises an estimate of position uncertainty for the aircraft.

17. The method of claim 13 wherein the operating further comprises displaying at least one of an estimate of position uncertainty, an actual navigation performance, or a required navigation performance.

18. The method of claim 13, further comprising comparing an estimate of position uncertainty to a required navigation performance, and wherein the operating comprises a displayed alert when the estimate of position uncertainty is greater than the required navigation performance.

19. The method of claim 13, further comprising altering a current flight path based on the single navigational solution.

* * * * *